(12) United States Patent
Yano (10) Patent No.: US 9,716,525 B2
(45) Date of Patent: Jul. 25, 2017

(54) ELECTRONIC DEVICE

(71) Applicant: KYOCERA Corporation, Kyoto-shi, Kyoto (JP)

(72) Inventor: Kentaro Yano, Suita (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/163,535

(22) Filed: May 24, 2016

(65) Prior Publication Data

US 2017/0093452 A1    Mar. 30, 2017

(30) Foreign Application Priority Data

Sep. 28, 2015   (JP) ................................. 2015-189408

(51) Int. Cl.
| | | |
|---|---|---|
| *A45F 5/00* | (2006.01) | |
| *A45C 11/00* | (2006.01) | |
| *H04B 1/3888* | (2015.01) | |

(52) U.S. Cl.
CPC ............ *H04B 1/3888* (2013.01); *A45C 11/00* (2013.01); *A45F 5/00* (2013.01); *A45C 2011/002* (2013.01)

(58) Field of Classification Search
CPC .......... F16B 21/02; F16B 21/04; G03B 17/02; G06F 2200/1634; H01M 2220/30; H04B 1/3816; H04B 1/3888; H04M 1/0214; H04M 1/0262; A45F 5/00; A45F 11/00; A45C 2011/002
See application file for complete search history.

(56) References Cited

U.S. PATENT DOCUMENTS

| | | | | |
|---|---|---|---|---|
| 5,206,098 A | * | 4/1993 | Cho ..................... | H01M 2/1055 429/100 |
| 5,323,364 A | * | 6/1994 | Hayashi ............. | G04B 37/0016 220/260 |
| 5,737,183 A | * | 4/1998 | Kobayashi et al. .. | G06F 1/1626 16/366 |
| 2001/0014055 A1 | * | 8/2001 | Martin ............... | G04B 37/0016 368/13 |
| 2004/0142721 A1 | * | 7/2004 | Kim .................... | H04M 1/0214 455/550.1 |
| 2014/0354879 A1 | * | 12/2014 | Sohn ................... | H01M 2/1022 348/375 |
| 2015/0141094 A1 | * | 5/2015 | Yano ...................... | F16B 21/04 455/575.8 |

FOREIGN PATENT DOCUMENTS

JP          2013-255007 A    12/2013

\* cited by examiner

*Primary Examiner* — Lewis West
(74) *Attorney, Agent, or Firm* — Procopio Cory Hargreaves and Savitch LLP (57) ABSTRACT

An electronic device includes a case, a lid removably attachable to the case, a bolt as a first fastening portion which is located in the lid and can secure at least a part of the lid to the case, and an insert nut as a second fastening portion which is located in the case and can be fastened to the first fastening portion. The lid can take at least two states of a proper attached state and a provisional attached state with respect to the case. In the proper attached state, the lid is relatively fixed to the case as the bolt and the insert nut are fastened to each other, and in the provisional attached state, the bolt is pressed against the insert nut while the bolt is not fastened to the insert nut.

10 Claims, 10 Drawing Sheets

ELECTRONIC DEVICE

CROSS-REFERENCE TO RELATED APPLICATION

The present application claims priority under 35 U.S.C. §119 to Japanese Patent Application No. 2015-189408, filed on Sep. 28, 2015, entitled "Electronic Device". The content of which is incorporated by reference herein in its entirety.

FIELD

The present disclosure relates to an electronic device.

BACKGROUND

Some of electronic devices such as water-resistant portable telephones are provided with an accommodation portion, the accommodation portion being closed by a lid. An exemplary electronic device including a rotary locking operation piece for removable attachment of such a lid has been known.

SUMMARY

An electronic device based on the present disclosure includes a case, a lid removably attachable to the case, a first fastening portion which is located in the lid and can secure at least a part of the lid to the case, and a second fastening portion which is located in the case at a position corresponding to the first fastening portion when the lid is attached to the case and can be fastened to the first fastening portion. The lid can take at least two states of a proper attached state and a provisional attached state with respect to the case. In the proper attached state, the lid is relatively fixed to the case as the first fastening portion and the second fastening portion are fastened to each other. In the provisional attached state, the first fastening portion is pressed against the second fastening portion while the first fastening portion is not fastened to the second fastening portion.

The foregoing and other objects, features, aspects and advantages of the present disclosure will become more apparent from the following detailed description of the present disclosure when taken in conjunction with the accompanying drawings.

DETAILED DESCRIPTION

A dimensional ratio shown in the drawings does not necessarily faithfully represent an actual dimensional ratio and a dimensional ratio may be exaggerated for the sake of convenience of description. A concept up or upper and down or lower mentioned in the description below does not mean absolute up or upper or down or lower but may mean relative up or upper or down or lower in terms of a shown position.

First Embodiment

Figure 1:
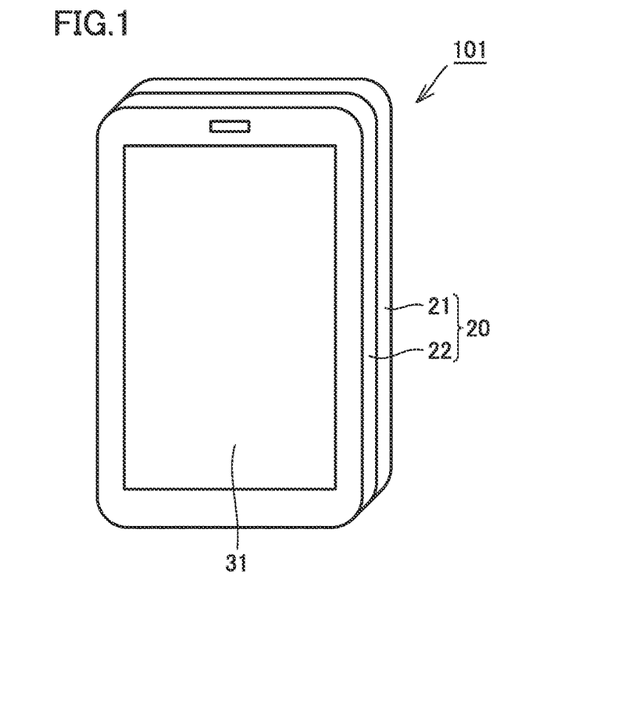
FIG. 1 is a first perspective view of an electronic device in a first embodiment based on the present disclosure.

An electronic device in a first embodiment based on the present disclosure will be described with reference to FIGS. 1 to 6. FIG. 1 shows appearance of an electronic device 101 in the first embodiment. Though electronic device 101 is described here as being implemented by a portable telephone, it is merely by way of example and electronic device 101 is not limited to a portable telephone. Various types of devices can be assumed as electronic device 101.

As shown in FIG. 1, electronic device 101 has a display area 31 on a front side. Electronic device 101 includes a case 20. Case 20 includes a rear case 21 and a front case 22. Rear case 21 may be formed by combining a plurality of parts. This is also applicable to front case 22.

Figure 2:
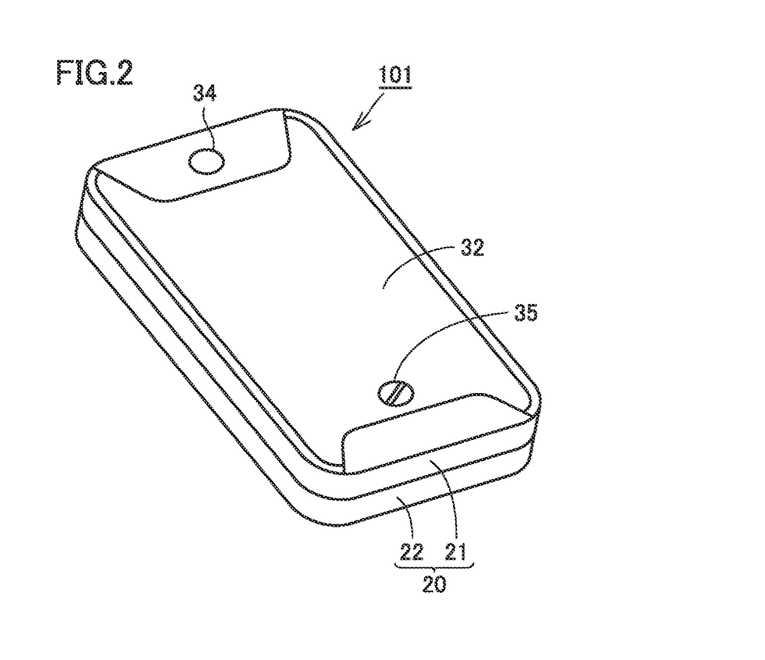
FIG. 2 is a second perspective view of the electronic device in the first embodiment based on the present disclosure.

FIG. 2 shows a perspective view of electronic device 101 positioned to mainly show a rear surface side thereof. For example, an image pick-up unit 34 may be provided at one end portion on the rear surface side. A lid 32 is combined with rear case 21. Lid 32 is a lid for covering a battery and the like accommodated in electronic device 101. A bolt 35 may be provided in lid 32. Bolt 35 serves to determine whether or not to lock lid 32. An outer shape of lid 32 shown here is merely by way of example and it is not necessarily as shown.

Figure 3:
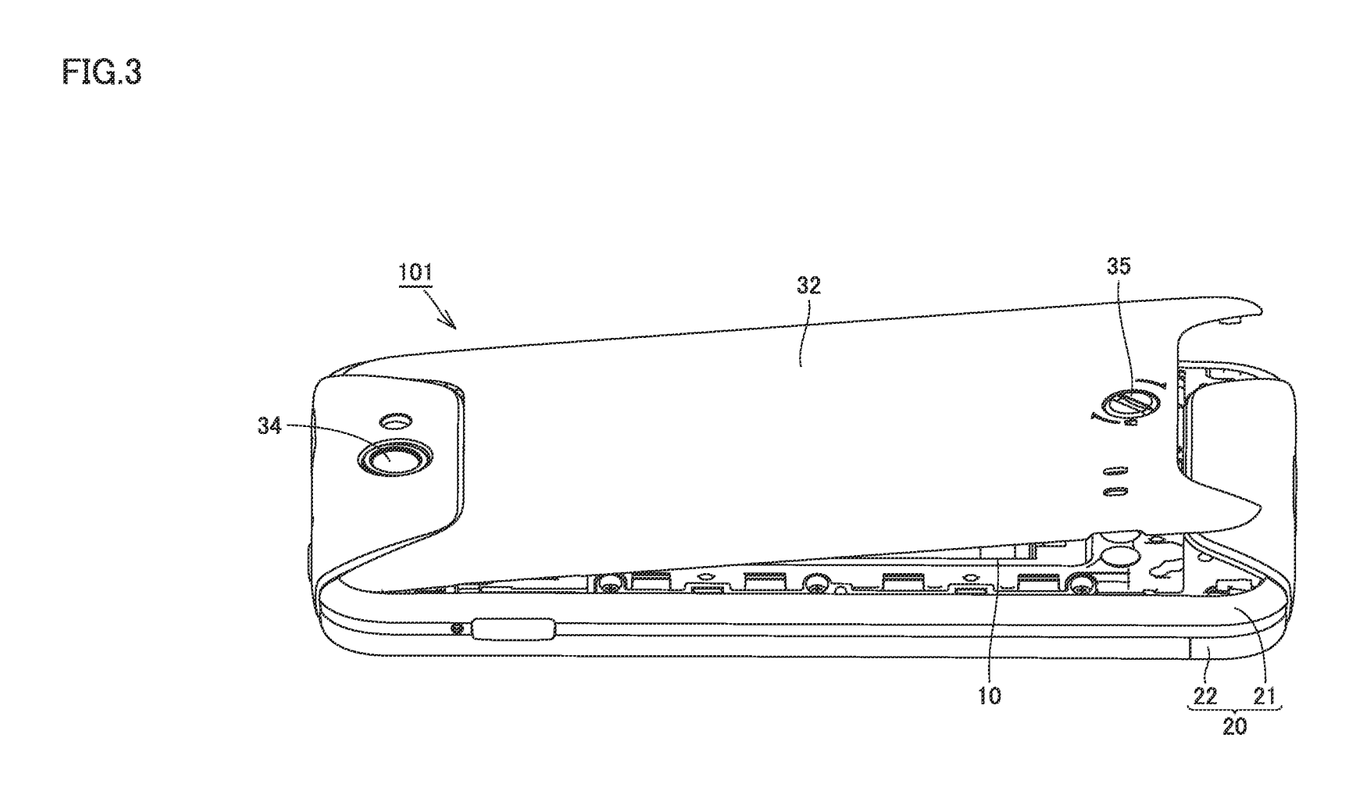
FIG. 3 is a perspective view of the electronic device in the first embodiment based on the present disclosure, with a lid being slightly opened.

FIG. 3 shows lid 32 which is slightly opened. Lid 32 is unlocked by loosening bolt 35, and an operator can lift one end of lid 32 as shown in FIG. 3.

Figure 4:
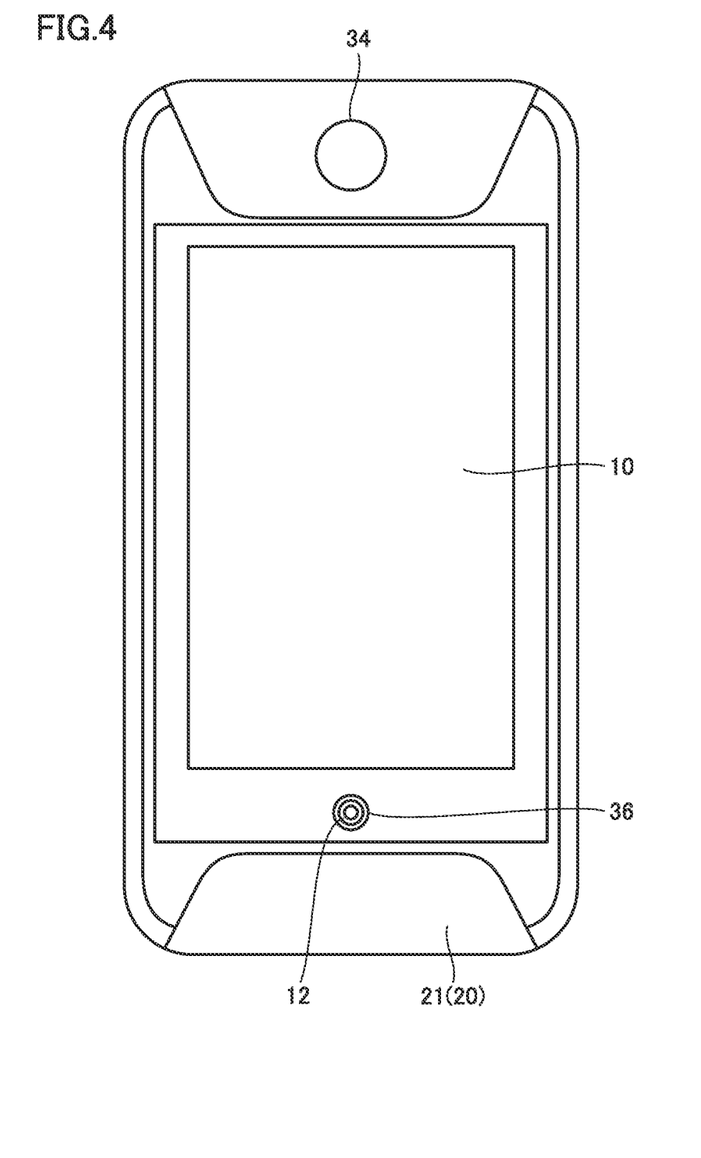
FIG. 4 is a plan view of the electronic device in the first embodiment based on the present disclosure, with the lid and a battery having been removed.

FIG. 4 shows a state that lid 32 and the battery have been removed. An accommodation portion 10 is seen. Accommodation portion 10 is a recess portion provided in rear case 21 for accommodating a battery. In FIG. 4, a bolt receiving hole 36 provided in rear case 21 is seen. Bolt receiving hole 36 is a hole which bolt 35 (see FIG. 3) enters. An insert nut 12 is embedded in a bottom of bolt receiving hole 36.

Figure 5:
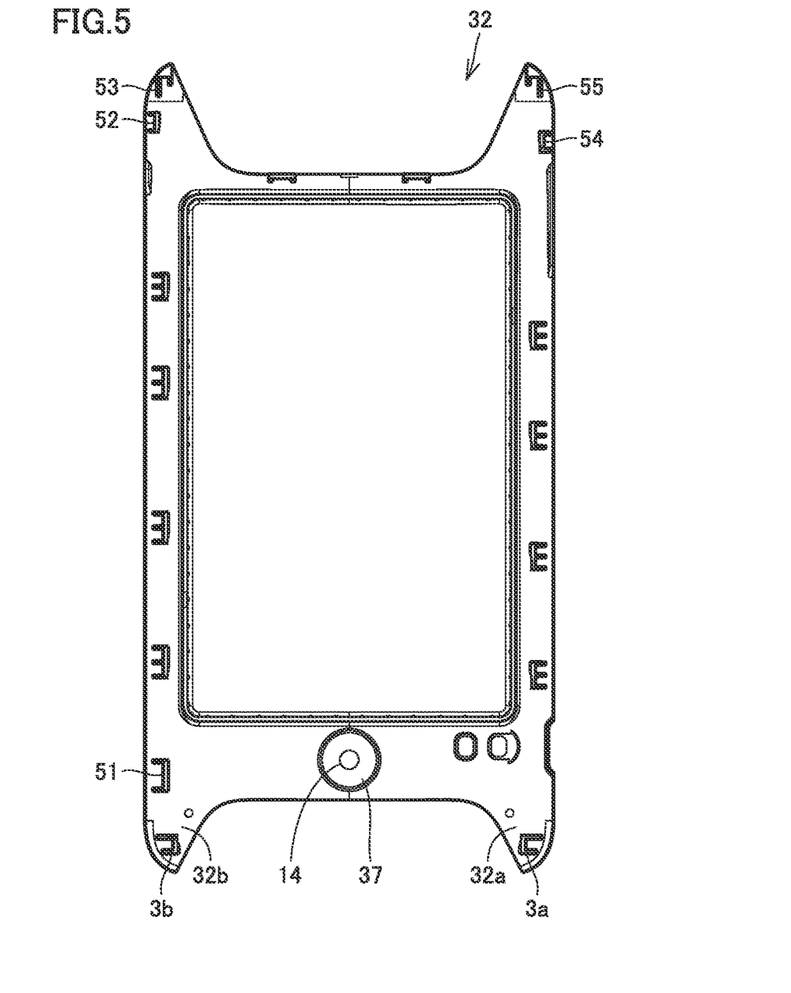
FIG. 5 is a plan view of the lid of the electronic device in the first embodiment based on the present disclosure, when viewed from a bottom.
Figure 6:
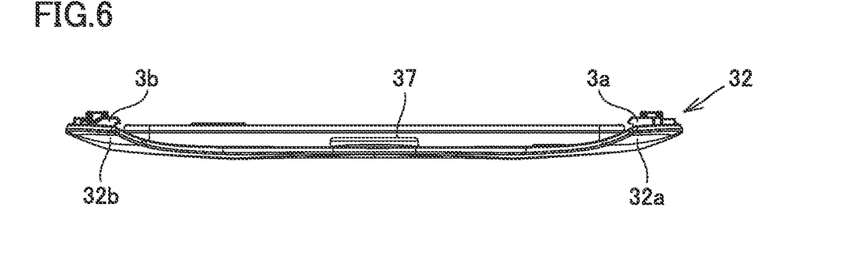
FIG. 6 is a side view of the lid of the electronic device in the first embodiment based on the present disclosure.

FIG. 5 shows lid 32 viewed from the bottom. The bottom of lid 32 means a side which faces accommodation portion 10 (see FIG. 4). Lid 32 includes protruding portions 32a and 32b. A hook portion 3a is provided in protruding portion 32a. A hook portion 3b is provided in protruding portion 32b. Lid 32 includes a bolt holding portion 37. Bolt holding portion 37 protrudes forward from the sheet surface in FIG. 5. A through hole 14 is provided in the center of bolt holding portion 37. In lid 32, not only hook portions 3a and 3b but also a first hook portion 51, a second hook portion 52, a third hook portion 53, a fourth hook portion 54, and a fifth hook portion 55 are provided to protrude forward from the sheet surface in FIG. 5. The number, arrangement, and a shape of hook portions shown here are merely by way of example, and they are not limited to those shown here. FIG. 6 shows lid 32 viewed from below in FIG. 5. FIG. 6 shows protrusion of bolt holding portion 37.

Bolt 35 is accommodated in bolt holding portion 37 of lid 32, passes through through hole 14, and is tightened into rear case 21 which is a part of case 20.

Electronic device 101 includes case 20, lid 32 removably attachable to case 20, a first fastening portion which is located in lid 32 and can secure at least a part of lid 32 to case 20, and a second fastening portion which is located in case 20 at a position corresponding to the first fastening portion when lid 32 is attached to case 20 and can be fastened to the first fastening portion. In the first embodiment, bolt 35 corresponds to the first fastening portion and insert nut 12 corresponds to the second fastening portion. Lid 32 can take at least two states of a proper attached state and a provisional attached state with respect to case 20. In the proper attached state, lid 32 is relatively fixed to case 20 as the first fastening portion and the second fastening portion are fastened to each other. In the provisional attached state, the first fastening portion is pressed against the second fastening portion while the first fastening portion is not fastened to the second fastening portion.

A detailed structure of a portion where bolt 35 is tightened into rear case 21 which is a part of case 20 will be described in a second embodiment shown later with reference to a cross-sectional view. A structure the same as described in the second embodiment is adopted also in the first embodiment as the structure around bolt 35.

In the first embodiment, since a portion in the vicinity of bolt 35 which secures lid 32 to rear case 21 is specially structured, the electronic device facilitates recognition by an operator as to whether or not locking of lid 32 by bolt 35 has normally been released. Details will be described in the second embodiment.

An "operator" here may be, for example, a user of the electronic device, a technician who does maintenance of the electronic device, or an operator other than the former.

Second Embodiment

Figure 7:
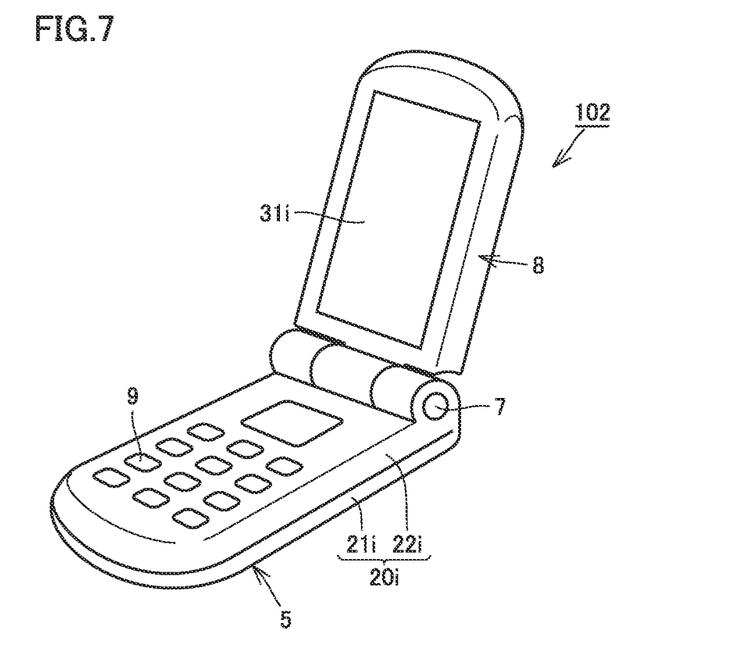
FIG. 7 is a first perspective view of an electronic device in a second embodiment based on the present disclosure.

An electronic device in a second embodiment based on the present disclosure will be described with reference to FIGS. 7 to 16. FIG. 7 shows appearance of an electronic device 102 in the second embodiment. Though electronic device 102 is described here as being implemented by a foldable portable telephone, this is merely by way of example and electronic device 102 is not limited to a foldable portable telephone. Various types of devices can be assumed as electronic device 102.

As shown in FIG. 7, electronic device 102 includes a main body portion 5 and a display unit 8. Main body portion 5 includes a case 20i. Case 20i includes a rear case 21i and a front case 22i. Rear case 21i may be formed by combining a plurality of parts. This is also applicable to front case 22i. Display unit 8 is pivotably attached to main body portion 5 with a hinge 7 being interposed. A display area 31i is provided in display unit 8. A button 9 for operation is provided in main body portion 5.

Figure 8:
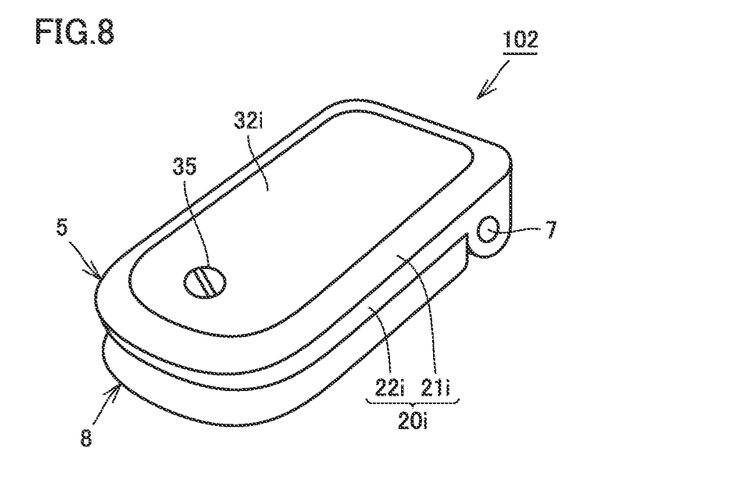
FIG. 8 is a second perspective view of the electronic device in the second embodiment based on the present disclosure.

FIG. 8 shows electronic device 102 in a folded state. FIG. 8 shows that main body portion 5 is located on an upper side and display unit 8 is located on a lower side. In this position, rear case 21i is located over front case 22i. A lid 32i is attached to rear case 21i. Lid 32i is locked by tightening bolt 35 into rear case 21i. In order to open lid 32i, locking should be released by loosening bolt 35.

Figure 9:
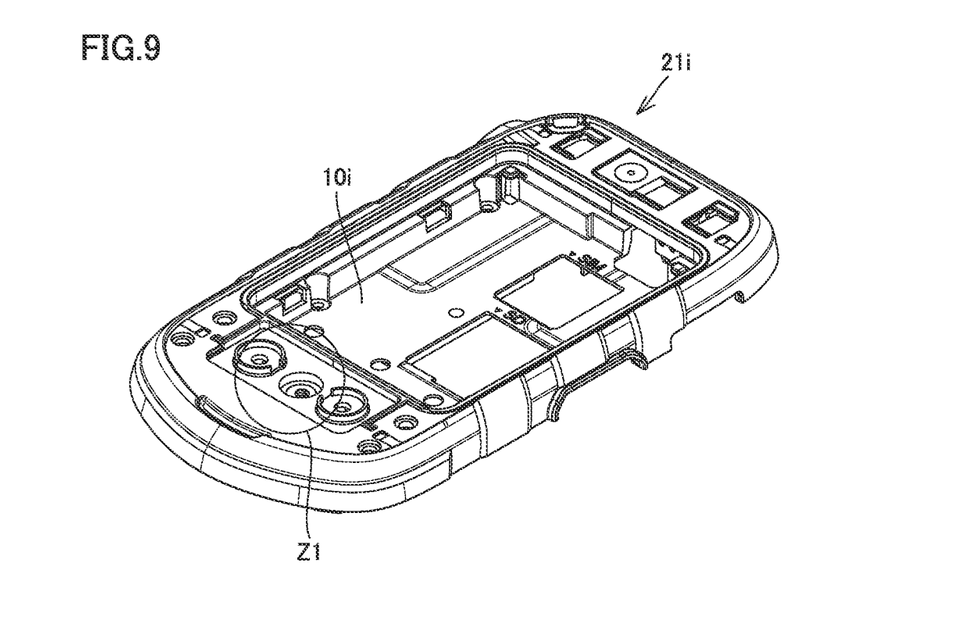
FIG. 9 is a perspective view of a rear case included in the electronic device in the second embodiment based on the present disclosure.
Figure 10:
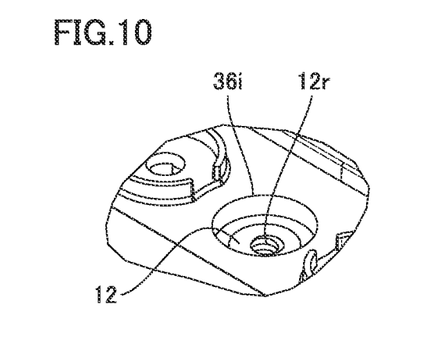
FIG. 10 is an enlarged view of a Z1 portion in FIG. 9.

FIG. 9 shows that rear case 21i alone has been extracted. Rear case 21i has an accommodation portion 10i provided as a recess portion. FIG. 10 shows a Z1 portion in FIG. 9 as being enlarged. Rear case 21i has a bolt receiving hole 36i. Insert nut 12 is embedded in a bottom of bolt receiving hole 36i. Insert nut 12 has a female thread 12r in an inner circumferential surface.

Figure 11:
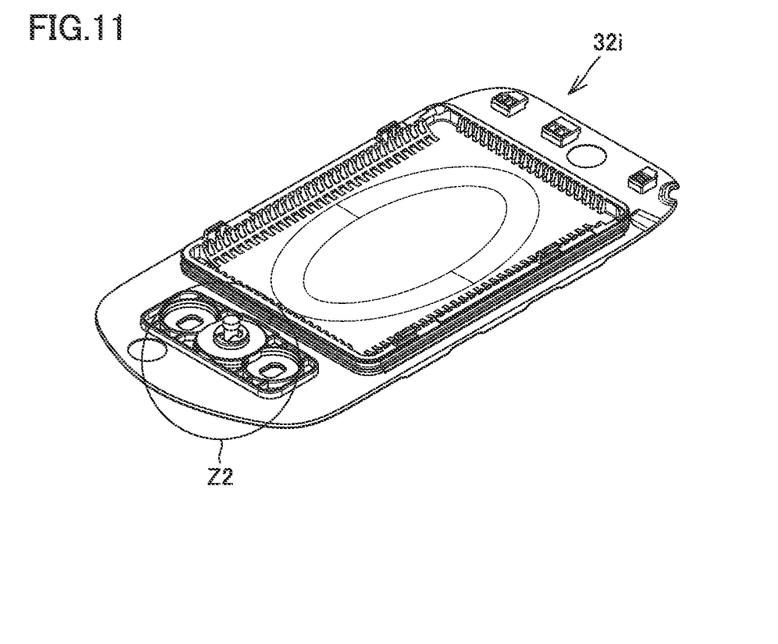
FIG. 11 is a perspective view of a lid included in the electronic device in the second embodiment based on the present disclosure.
Figure 12:
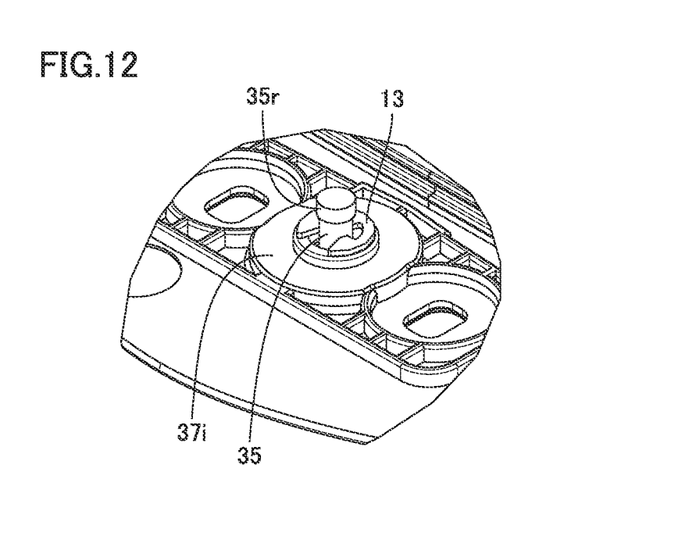
FIG. 12 is an enlarged view of a Z2 portion in FIG. 11.

FIG. 11 shows lid 32i as being extracted substantially alone. FIG. 11 shows lid 32i with its surface opposed to rear case 21i facing upward. FIG. 12 shows a Z2 portion in FIG. 11 as being enlarged. Lid 32i has a bolt holding portion 37i. Bolt 35 and an E ring 13 are attached to lid 32i. Bolt 35 passes through lid 32i. In FIG. 12, a head of bolt 35 is hidden behind bolt holding portion 37i. As shown in FIG. 12, a male thread 35r is provided on an outer circumferential surface at a tip end portion of bolt 35. Male thread 35r may be provided only in the tip end portion of bolt 35. There may be a section where no male thread is provided between a section at the tip end portion of bolt 35 where male thread 35r is provided and the head of bolt 35. E ring 13 surrounds one portion on a side of the head relative to the section where male thread 35r is provided. An inner diameter of E ring 13 is smaller than an outer diameter of male thread 35r. Therefore, E ring 13 does not go beyond male thread 35r and come off from bolt 35. Since E ring 13 is attached to bolt 35, bolt 35 does not come off from bolt holding portion 37i. Bolt 35 is thus attached to lid 32i.

Figure 13:
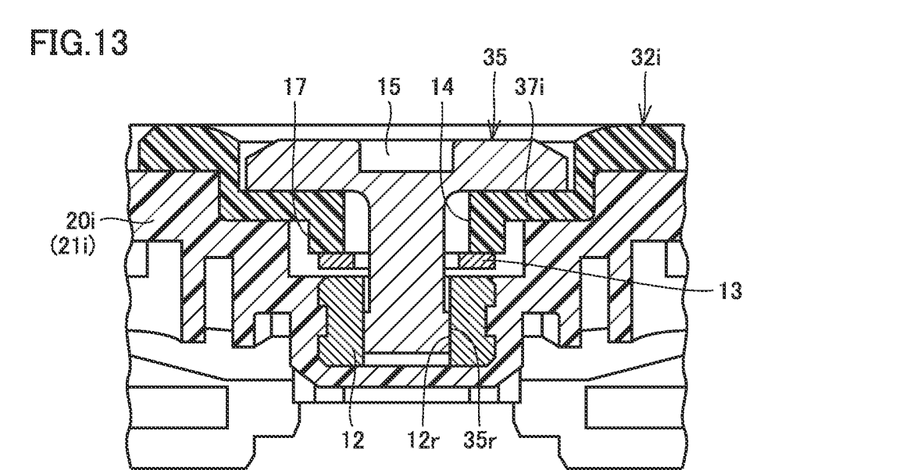
FIG. 13 is a cross-sectional view of a portion in the vicinity of a bolt while the electronic device in the second embodiment based on the present disclosure is in a proper attached state.

Lid 32i is completely closed and locked by bolt 35 in FIG. 8, and FIG. 13 shows a cross-sectional view of a portion in the vicinity of bolt 35 in this state. A part of lid 32i is recessed and serves as bolt holding portion 37i. Bolt holding portion 37i is provided as a recess portion for accommodating the head of bolt 35. Therefore, bolt holding portion 37i has an inner diameter slightly greater than an outer diameter of the head of bolt 35. Through hole 14 is provided in a bottom surface of bolt holding portion 37i, and bolt 35 passes through through hole 14. Lid 32i includes a protruding portion 17 extending along through hole 14 toward insert nut 12. Protruding portion 17 serves to keep E ring 13 at a position distant to some extent from a bottom surface of bolt holding portion 37i toward insert nut 12. Protruding portion 17 may be, for example, in a cylindrical shape. When protruding portion 17 is cylindrical, protruding portion 17 desirably has an inner diameter smaller than an outer diameter of E ring 13.

Figure 14:
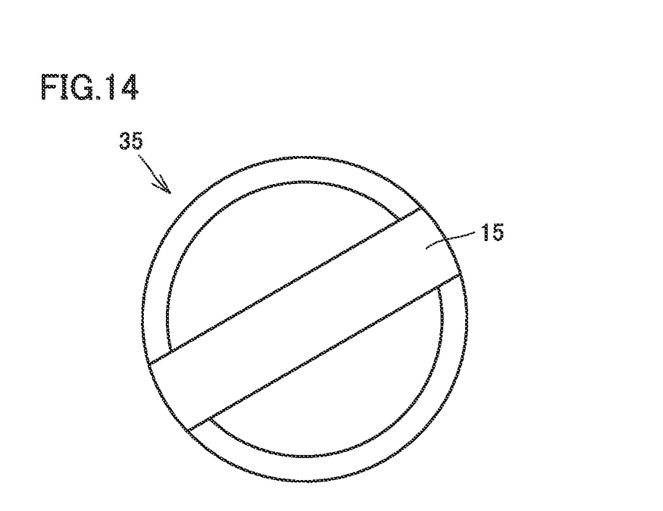
FIG. 14 is a plan view of a bolt included in the electronic device in the second embodiment based on the present disclosure.
Figure 15:
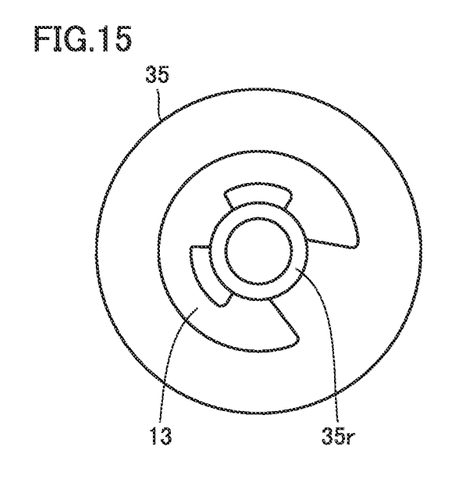
FIG. 15 is a plan view of a combination of a bolt and an E ring included in the electronic device in the second embodiment based on the present disclosure, when viewed from a tip end side.
Figure 16:
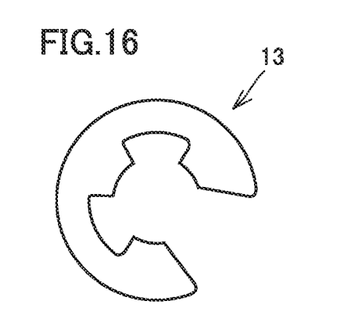
FIG. 16 is a plan view of the E ring included in the electronic device in the second embodiment based on the present disclosure.

FIG. 14 shows a plan view of bolt 35 as being extracted alone and viewed from the side of the head. Bolt 35 has a groove 15 in the head. Groove 15 is provided for receiving a coin or the like when an operator performs an operation to turn bolt 35. Groove 15 is, for example, provided as one linear groove in a plan view. Groove 15 may have a depth varying like an arc in a cross-section such that an end of a coin fits therein. Groove 15 may have a depth greater in the center and smaller on opposing ends. FIG. 15 shows a plan view of a combination of bolt 35 and E ring 13 as being extracted, when viewed from a side of the tip end of bolt 35. In FIG. 15, male thread 35r is present on a front side of E ring 13. FIG. 16 shows a plan view of E ring 13 as being extracted alone. E ring 13 may be formed, for example, from a metal plate.

A construction of electronic device 102 in the second embodiment is summarized as below. Electronic device 102 includes case 20i, lid 32i removably attachable to case 20i, a first fastening portion which is located in lid 32i and can secure at least a part of lid 32i to case 20i, and a second fastening portion which is located in case 20i at a position corresponding to the first fastening portion when lid 32i is attached to case 20i and can be fastened to the first fastening portion. In the second embodiment, bolt 35 corresponds to the first fastening portion and insert nut 12 corresponds to the second fastening portion. Lid 32i can take at least two states of a proper attached state and a provisional attached state with respect to case 20i. In the proper attached state, lid 32i is relatively fixed to case 20i as the first fastening portion and the second fastening portion are fastened to each other. In the provisional attached state, the first fastening portion is pressed against the second fastening portion while the first fastening portion is not fastened to the second fastening portion. The state shown in FIG. 13 corresponds to the proper attached state. In the state shown in FIG. 13, a portion where male thread 35r of bolt 35 is provided is introduced deep into insert nut 12 and is distant from E ring 13.

Though FIG. 13 shows that E ring 13 abuts to protruding portion 17, actually, E ring 13 does not necessarily abut to protruding portion 17 and it may be at any position in a gap between a lower surface of protruding portion 17 and an upper surface of insert nut 12. Though E ring 13 is schematically shown as being in a form of a flat plate in the drawings, E ring 13 may actually deform and it is not necessarily fully flat.

Figure 17:
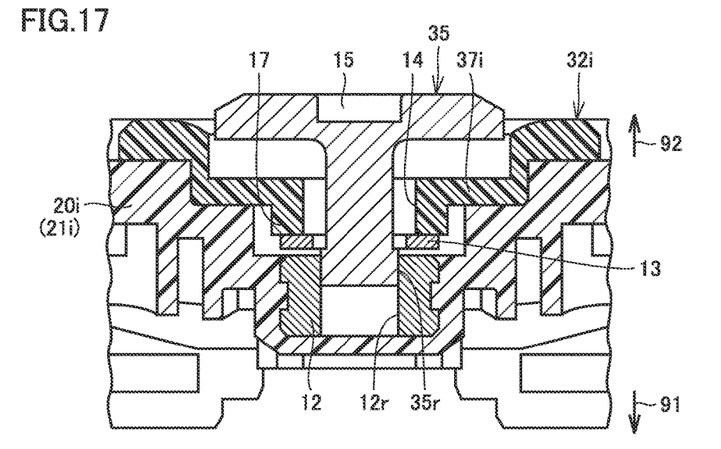
FIG. 17 is a cross-sectional view of a state after an operator starts to perform an operation for loosening the bolt in the electronic device in the second embodiment based on the present disclosure.

In the second embodiment, when an operator performs an operation to loosen bolt 35, transition from the state shown in FIG. 13 to the state shown in FIG. 17 is made. A portion of bolt 35 where male thread 35r is provided moves in a direction (a direction shown with an arrow 92) in which it comes off from insert nut 12, and an upper end of male thread 35r abuts to E ring 13 in FIG. 17. In this state, a part of male thread 35r of bolt 35 is being engaged with a part of female thread 12r of insert nut 12. In FIG. 17, bolt 35 is lifted, for example, by 1.3 mm as compared with FIG. 13. Since male thread 35r cannot pass through an inner side of E ring 13, male thread 35r lifts up E ring 13 and the upper surface of E ring 13 comes in contact with the lower surface of protruding portion 17 of lid 32i as the E ring is lifted up as such.

Since the lower surface of protruding portion 17 restricts a position of E ring 13, male thread 35r abuts to E ring 13 in such an early stage as male thread 35r of bolt 35 moves in a direction of coming off from insert nut 12 (the direction shown with arrow 92) by an operation to loosen bolt 35 by the operator. Furthermore, since presence of protruding portion 17 restricts an amount of relative displacement of E ring 13 in lid 32i in a direction shown with arrow 92, male thread 35r lifts up E ring 13 with movement upward of bolt 35 and E ring 13 lies between male thread 35r and protruding portion 17. Consequently, male thread 35r of bolt 35 lifts up protruding portion 17, that is, lid 32i, with E ring 13 being interposed. When male thread 35r is further lifted up from the state shown in FIG. 17, E ring 13 is lifted up in the direction shown with arrow 92.

Figure 18:
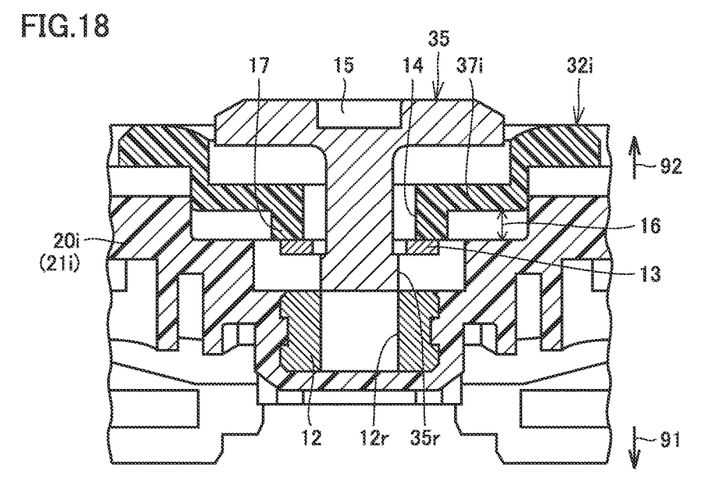
FIG. 18 is a cross-sectional view of a portion in the vicinity of the bolt while the electronic device in the second embodiment based on the present disclosure is in a provisional attached state.

When the operator further performs the operation to loosen bolt 35 from the state shown in FIG. 17, bolt 35 moves in the direction shown with arrow 92 and completely moves out of insert nut 12. Transition to the state shown in FIG. 18 is thus made. In this state, male thread 35r is not engaged with female thread 12r at all. E ring 13 still lies between male thread 35r and protruding portion 17. In FIG. 18, bolt 35 is lifted up, for example, by 2.1 mm as compared with FIG. 13. Bolt 35 is carried on insert nut 12. E ring 13 is further lifted up in the direction shown with arrow 92 by an amount comparable to lift-up of male thread 35r. Since E ring 13 cannot pass through through hole 14, lid 32i is lifted up in the direction shown with arrow 92 with lift-up of E ring 13. As lid 32i is lifted up, a gap 16 is created between a lower surface of bolt holding portion 37i and case 20i. Presence of protruding portion 17 in lid 32i results in gap 16 having a size to some extent or more. For increase in size of gap 16, protruding portion 17 should be greater in height. The state shown in FIG. 18 corresponds to the provisional attached state.

Though lid 32i is lifted up by E ring 13, lid 32i is still engaged with case 20i by a hook portion in a portion far from bolt 35. Therefore, lid 32i is elastically deformed in at least a part, trying to return to an original flat state, and this elastic force biases E ring 13 downward (a direction shown with an arrow 91). Since E ring 13 cannot pass through male thread 35r to move downward, biasing of E ring 13 downward by lid 32i is nothing other than biasing of bolt 35 downward (the direction shown with arrow 91) with E ring 13 being interposed. When the operator further performs the operation to loosen bolt 35 while bolt 35 is thus biased downward and pressed against insert nut 12, a sound is produced because relative rotation is made while a lower end of male thread 35r is in intimate contact with an upper end of female thread 12r without engagement with each other. For example, each time the operator turns bolt 35 in a direction for loosening the bolt, a click sound is produced.

As shown in one example in the second embodiment, transition between the proper attached state and the provisional attached state can be made by operating the first fastening portion, and a sound may be produced when an operation similar in type to transition from the proper attached state to the provisional attached state is performed on the first fastening portion to a certain extent or more in the provisional attached state. With such a construction, since the operator can perceive based on the sound, the fact that transition from the proper attached state to the provisional attached state has been completed, the electronic device facilitates recognition by the operator as to whether or not the lid has been unlocked. Measures for informing the operator are not limited to a sound. For example, clicking feedback may be applicable.

As shown in the second embodiment, the first fastening portion may be formed from a part arranged to pass through lid 32i and formed by providing a male thread in at least a part on the side of the second fastening portion relative to lid 32i, and the second fastening portion is formed from a part having a female thread. By adopting this construction, relative rotation is made in a direction of further loosening while the male thread and the female thread are pressed against each other. Therefore, with a simplified structure, the operator can be informed of the fact that the provisional attached state has already been established. With this construction, the electronic device can facilitate recognition by the operator as to whether or not the lid has been unlocked. In the second embodiment, by way of example satisfying this condition, bolt 35 having male thread 35r is adopted as the first fastening portion and insert nut 12 having female thread 12r is adopted as the second fastening portion. The first fastening portion may be formed from a bolt and the second fastening portion may be formed from a nut, and vice versa. The first fastening portion and the second fastening portion may be formed from some kind of a fastening structure other than a combination of a bolt and a nut.

The first fastening portion and the second fastening portion may both be formed of a metal. By adopting this construction, wear or chipping of the first fastening portion and the second fastening portion can be suppressed as much as possible. With the metal, a clicking sound or clicking feedback produced while the first fastening portion and the second fastening portion are turned relative to each other as being pressed against each other would facilitate recognition by the operator.

A surrounding member may be attached to the first fastening portion so as to surround the first fastening portion on the side of the second fastening portion relative to lid 32i, and in the provisional attached state, lid 32i may press the first fastening portion against the second fastening portion by pressing the surrounding member toward the second fastening portion. By adopting a surrounding member, such a structure that the first fastening portion is pressed against the second fastening portion in a limited space with a small number of parts can readily be realized.

The first fastening portion may be made harder to come off from lid 32i as the surrounding member is caught by lid 32i. By adopting this construction, there is no possibility of the first fastening portion coming off from the lid at undesired timing, and hence the operator can handle the first fastening portion as being integrated with the lid and operability is improved. There is no possibility either of missing of the first fastening portion alone.

The surrounding member may be formed from an E ring. By adopting this construction, the surrounding member can be realized with an inexpensive and simple structure.

As shown in the second embodiment, lid 32i may include protruding portion 17 so as to restrict an amount of displacement of the surrounding member in a direction away from the second fastening portion. By adopting this construction, in loosening the first fastening portion, the first fastening portion can press the lid in an early stage with the surrounding member being interposed (see FIG. 17). A large amount of floating of the lid from the case can thus be ensured. The shape of protruding portion 17 shown here is merely by way of example and the shape is not limited as such.

The first fastening portion may have groove 15 which accepts a part of a coin, at an end portion opposite to the second fastening portion, and the first fastening portion may be turned by using the coin. By adopting this construction, even though large force is required for turning the first fastening portion, the operator can reliably turn the first fastening portion with a coin at hand.

Some of additional features described in embodiments above may be adopted as being combined as appropriate.

Though description has been given so far by using the term "electronic device," the electronic device is a broad concept covering, for example, a portable telephone, a portable information terminal, a tablet terminal, a personal computer, a game console, a television receiver, a portable music player, a CD player, a DVD player, an electronic dictionary, an electronic book reader, a digital camera, a video camera, a radio receiver, and a navigation system. The concept of the portable telephone or the portable information terminal includes a smartphone.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

The invention claimed is:

1. An electronic device comprising:
a case;
a lid which is removably attachable to the case;
a first fastening portion which is located in the lid and can secure at least a part of the lid to the case; and
a second fastening portion which is located in the case at a position corresponding to the first fastening portion when the lid is attached to the case and can be fastened to the first fastening portion,
wherein the lid is able to take at least two states with respect to the case, and
wherein the at least two states comprise
a proper attached state, in which the first fastening portion and the second fastening portion are fastened to each other such that the lid is fixed to the case, and
a provisional attached state, in which the first fastening portion is not fastened to the second fastening portion, but is biased towards the second fastening portion by elastic deformation of the lid.

2. The electronic device according to claim 1, wherein an operation of the first fastening portion while the lid is removably attached to the case in the proper attached state causes a transition to the provisional attached state, and wherein the same operation of the first fastening portion while the lid is removably attached to the case in the provisional attached state produces a sound.

3. The electronic device according to claim 1, wherein the first fastening portion comprises a first part comprising a male thread arranged to pass through the lid, and wherein the second fastening portion comprises a second part comprising a female thread configured to receive the male thread.

4. The electronic device according to claim 3, wherein the first fastening portion and the second fastening portion are both formed of a metal.

5. The electronic device according to claim 3, wherein the first fastening portion comprises a surrounding portion that surrounds the first part at a position between the lid and the male thread, and wherein, in the provisional attached state, the lid presses the first fastening portion against the second fastening portion by pressing the surrounding member toward the second fastening portion.

6. The electronic device according to claim 5, wherein the first part of the first fastening portion passes through an opening in the lid that has a smaller inner diameter than an outer diameter of the surrounding member, such that the surrounding member is caught by the lid.

7. The electronic device according to claim 5, wherein the surrounding member comprises an E ring.

8. The electronic device according to claim 5, wherein the lid includes a protruding portion that restricts an amount of displacement of the surrounding member in a direction away from the second fastening portion.

9. The electronic device according to claim 3, wherein the first fastening portion comprises a groove at an end portion opposite to the second fastening portion, such that the first fastening portion can be turned using an object inserted in the groove.

10. The electronic device according to claim 1, wherein the lid is removably attachable to the case via one or more hooks.

\* \* \* \* \*